US009385782B1

(12) United States Patent
Yonge, III et al.

(10) Patent No.: US 9,385,782 B1
(45) Date of Patent: Jul. 5, 2016

(54) COMMUNICATION BETWEEN NETWORK NODES

(75) Inventors: Lawrence W. Yonge, III, Ocala, FL (US); Srinivas Katar, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 1027 days.

(21) Appl. No.: 12/979,780

(22) Filed: Dec. 28, 2010

Related U.S. Application Data

(60) Provisional application No. 61/293,585, filed on Jan. 8, 2010.

(51) Int. Cl.
    *H04L 12/66*    (2006.01)
    *H04B 3/54*     (2006.01)

(52) U.S. Cl.
    CPC ........ *H04B 3/54* (2013.01); *H04L 12/66* (2013.01); *H04B 2203/542* (2013.01)

(58) Field of Classification Search
    CPC ... H04L 29/06163; H04L 29/02; H04L 29/06; H04B 7/2612; H04B 7/2643; H04B 7/2646; H04B 7/2671; H04B 7/2675
    USPC ........................................................ 370/401
    See application file for complete search history.

(56) References Cited

U.S. PATENT DOCUMENTS

| 5,124,982 | A  | 6/1992  | Kaku |
| 6,373,376 | B1 | 4/2002  | Adams et al. |
| 6,965,303 | B2 | 11/2005 | Mollenkopf |
| 7,440,443 | B2 | 10/2008 | Logvinov et al. |
| 7,450,000 | B2 | 11/2008 | Gidge et al. |
| 7,558,294 | B2 | 7/2009  | Yonge, III et al. |
| 7,724,764 | B2 | 5/2010  | Lifshitz et al. |
| 7,729,372 | B2 | 6/2010  | Yonge, III et al. |
| 2001/0010716 | A1 | 8/2001  | Smith et al. |
| 2003/0198246 | A1 | 10/2003 | Lifshitz et al. |
| 2004/0110483 | A1 | 6/2004  | Mollenkopf |
| 2004/0227621 | A1 | 11/2004 | Cope et al. |

(Continued)

FOREIGN PATENT DOCUMENTS

WO    WO2004/080075    9/2004

OTHER PUBLICATIONS

Arar, Yardena, "Just Plug It In: Networking Via Power Circuits", [online] PC World Magazine, Apr. 2002 [retrieved on Oct. 6, 2005]. Retrieved from the interne] URL: <http://www.pcworld.com/resource/printable/article/0.aid.85003,.00.asp>.

(Continued)

*Primary Examiner* — Ayaz Sheikh
*Assistant Examiner* — Tarell Hampton
(74) *Attorney, Agent, or Firm* — DeLizio Law, PLLC

(57) ABSTRACT

Network signals are coupled to and from a first communication medium that is coupled to one or more nodes of a first network that exchange signals according to at least one scheduling constraint of the first communication medium. Network signals are coupled to and from a second communication medium that is coupled to one or more nodes of a second network that exchange signals according to a schedule compatible with scheduling information received from the first network. Information conveyed by the coupled network signals is communicated between a first network node and a second network node, according to the schedule compatible with the scheduling information received from the first network.

22 Claims, 8 Drawing Sheets

(56) References Cited

U.S. PATENT DOCUMENTS

| | | |
|---|---|---|
| 2004/0227622 A1 | 11/2004 | Giannini et al. |
| 2005/0001694 A1 | 1/2005 | Berkman |
| 2005/0046550 A1 | 3/2005 | Crenshaw et al. |
| 2005/0047175 A1 | 3/2005 | Kawasaki et al. |
| 2005/0063355 A1 | 3/2005 | Iwamura |
| 2005/0068223 A1 | 3/2005 | Vavik |
| 2005/0168326 A1 | 8/2005 | White et al. |
| 2005/0169056 A1 | 8/2005 | Berkman et al. |
| 2005/0200459 A1 | 9/2005 | White |
| 2005/0232344 A1 | 10/2005 | Mollenkopf |
| 2006/0013129 A1 | 1/2006 | Sterenson et al. |
| 2006/0097573 A1 | 5/2006 | Gidge et al. |
| 2006/0120386 A1* | 6/2006 | Rossi et al. .................. 370/401 |
| 2006/0152344 A1 | 7/2006 | Mowery |
| 2006/0165054 A1* | 7/2006 | Iwamura ...................... 370/351 |
| 2006/0255930 A1 | 11/2006 | Berkman |
| 2006/0286927 A1 | 12/2006 | Berkman |
| 2007/0002771 A1 | 1/2007 | Berkman et al. |
| 2007/0025383 A1* | 2/2007 | Katar |
| 2007/0025386 A1 | 2/2007 | Riedel et al. |
| 2007/0025391 A1 | 2/2007 | Yonge, III et al. |
| 2007/0036171 A1 | 2/2007 | Magin |
| 2007/0064720 A1 | 3/2007 | Sterenson et al. |
| 2007/0138867 A1* | 6/2007 | Choi et al. ........................ 307/3 |
| 2007/0153815 A1* | 7/2007 | She et al. ...................... 370/401 |
| 2007/0165666 A1 | 7/2007 | Lifshitz et al. |
| 2008/0175147 A1* | 7/2008 | Lakkakorpi .................. 370/230 |
| 2008/0285596 A1* | 11/2008 | Hady et al. ................... 370/503 |
| 2009/0109991 A1 | 4/2009 | Lurie et al. |
| 2009/0109992 A1 | 4/2009 | Lurie et al. |
| 2009/0175291 A1* | 7/2009 | Galli et al. ................... 370/442 |

OTHER PUBLICATIONS

HomePlug AV Specification Version 1.1, HomePlug Powerline Alliance, May 21, 2007, 673 pages.

International Search Report & Written Opinion issued in PCT application No. PCT/US06/31312, dated Apr. 19, 2007, 9 pages.

Series G: Transmission Systems and Media, Digital Systems and Networks—Access networks—In premises Networks. Home networking transceivers—Enhances physical, media access, and link layer specifications. ITU-T Telecommunication Standardization Sector of ITU, International Telecommunication Union, Jan. 2007, 261 pages.

* cited by examiner

COMMUNICATION BETWEEN NETWORK NODES

CROSS-REFERENCE TO RELATED APPLICATIONS

This application claims priority to U.S. Application Ser. No. 61/293,585, filed on Jan. 8, 2010, incorporated herein by reference.

TECHNICAL FIELD

This description relates to relates to communicating between network nodes.

BACKGROUND

A communication network interconnects nodes that have an interface to a communication medium used by the network. The nodes can be network devices that communicate between one another, for example, as well as devices that facilitate that communication such as hubs, routers, and bridges. The communication medium can be the physical elements providing a link between the nodes, such as twisted-wire cables, coaxial cable, and power lines. Communication over a network can occur over multiple layers each having a protocol designed for that layer. For example, communication between two network devices having a direct physical link might use one protocol layer, while communication between two network devices separated by other nodes such as routers and bridges might use another protocol layer.

SUMMARY

In one aspect, in general, an apparatus comprises: a first signal interface configured to couple signals to and from a first communication medium that is coupled to one or more nodes of a first network that exchange signals according to at least one scheduling constraint of the first communication medium; a second signal interface configured to couple signals to and from a second communication medium that is coupled to one or more nodes of a second network that exchange signals according to a schedule compatible with scheduling information received from the first network; and signal coupling circuitry configured to activate at least one of the first and second signal interfaces to communicate information between a first network node and a second network node, according to the schedule compatible with the scheduling information received from the first network.

Aspects can include one or more of the following features.

The signal coupling circuitry is configured to activate a third signal interface configured to couple signals to and from a third communication medium that is coupled to one or more nodes of a third network that exchange signals according to a schedule compatible with scheduling information received from the first network.

The first network node is a node in the first network and the second network node is a node in the second network.

The first network node is integrated with the signal coupling circuitry and the second network node is a node in one of the first or second networks.

The apparatus further comprises a third signal interface configured to couple signals to and from a host device.

The signal coupling circuitry is configured to activate the third signal interface to communicate information between the host device and a network node, according to the schedule compatible with the scheduling information received from the first network The first and second signal interfaces communicate information from a first network node to multiple other network nodes.

The signal coupling circuitry is in communication with a coordination device capable of generating a schedule compatible with the at least one scheduling constraint of the first communication medium.

The coordination device is a node of the first network.

The coordination device is a node of the second network.

The apparatus further comprises schedule coordination functionality capable of generating a schedule compatible with the at least one scheduling constraint of the first communication medium.

The schedule coordination functionality is configured to communicate the generated schedule to a network node.

The at least one scheduling constraint is determined based on a characteristic of the first communication medium.

The first signal interface and the second signal interface share a common medium access control layer interface.

The medium access control layer interface has one or more features that are configurable for use with the first network and for use with the second network.

The first signal interface and the second signal interface share a common physical layer interface.

The physical layer interface has one or more features that are configurable for use with the first network and for use with the second network.

The apparatus further comprises network communication circuitry configured to pass signals directly between the first signal interface and the second signal interface.

The apparatus further comprises network communication circuitry configured to modulate and demodulate signals and further configured to pass the signals to and from at least one of the network interfaces.

The first communication medium is capable of communicating signals at a different rate of data transfer than the second communication medium.

The first communication medium comprises a power line medium.

Alternating current is carried by the power line medium.

The at least one scheduling constraint is determined at least partially by the waveform of the alternating current.

The at least one scheduling constraint is determined according to information about the start time and duration of a beacon period that depends on the frequency of the alternating current's line cycle.

The information about the beacon period is received from a coordination device on the power line medium.

The information about the beacon period is received from a coordination device on a medium other than the power line medium.

The information about the beacon period is determined by functionality integrated with the signal coupling circuitry.

The at least one scheduling constraint is determined at least partially by traffic characteristics of the first network.

The at least one scheduling constraint is determined at least partially by application quality of service requirements of the first network.

The second communication medium comprises a coaxial cable.

The second communication medium comprises a phone line.

Signals coupled to and from the first communication medium operate according to a time division multiple access protocol.

Signals coupled to and from the first communication medium operate according to a carrier sense multiple access protocol with defined time periods of carrier sensing.

In another aspect, in general, a method comprises: coupling network signals to and from a first communication medium that is coupled to one or more nodes of a first network that exchange signals according to at least one scheduling constraint of the first communication medium; coupling network signals to and from a second communication medium that is coupled to one or more nodes of a second network that exchange signals according to a schedule compatible with scheduling information received from the first network; and communicating information conveyed by the coupled network signals between a first network node and a second network node, according to the schedule compatible with the scheduling information received from the first network.

Aspects can include one or more of the following features.

The first network node is a node in the first network and the second network node is a node in the second network.

The method further comprises coupling a network signal to and from a host device.

The first network node is the host device and the second network node is a node on the first or second networks.

The method further comprises communicating information conveyed by the coupled network signals from a first network node to multiple other network nodes.

The method further comprises receiving the schedule from a coordination device on the first or second networks.

The method further comprises generating the schedule using the received scheduling information.

The method further comprises communicating the generated schedule to a network node.

The at least one scheduling constraint is determined based on a characteristic of the first communication medium.

The method further comprises configuring features of a network interface based on a choice of communication medium.

Network signals are coupled to and from the first communication medium at a different rate of data transfer than network signals are coupled to and from the second communication medium.

The method further comprises determining the at least one scheduling constraint according to a waveform of alternating current carried by the first communication medium.

The at least one scheduling constraint is determined according to information about the start time and duration of a beacon period that depends on the waveform of alternating current.

The method further comprises receiving the information about the beacon period from a coordination device on the first communications medium.

The method further comprises receiving the information about the beacon period from a coordination device on a medium other than the first communications medium. The method further comprises determining the information about the beacon period.

The method further comprises determining the at least one scheduling constraint at least partially by traffic characteristics of the first network.

The method further comprises determining the at least one scheduling constraint at least partially by application quality of service requirements of the first network.

The network signals are coupled to and from the first and second communications media using multiple devices.

The method further comprises choosing one of the multiple devices to couple the network signals.

Among the many advantages of the invention (some of which may be achieved only in some of its various aspects and implementations) are the following.

A multi-network device that communicates information between a first network node and a second network node, according to the schedule compatible with the scheduling information received from the first network is able to use a common MAC layer for both networks and reduce the expense of incorporating a second separate MAC layer.

Other aspects and advantages will be apparent from the detailed description, drawings, appendices and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Overview

Two network devices operating on different networks using different media can communicate with each other by conveying their communication through a device that can communicate on multiple networks. For example, the multi-network device can receive a communication from one of the devices on the first network and retransmit the communication to the other device on the other network.

Figure 1:
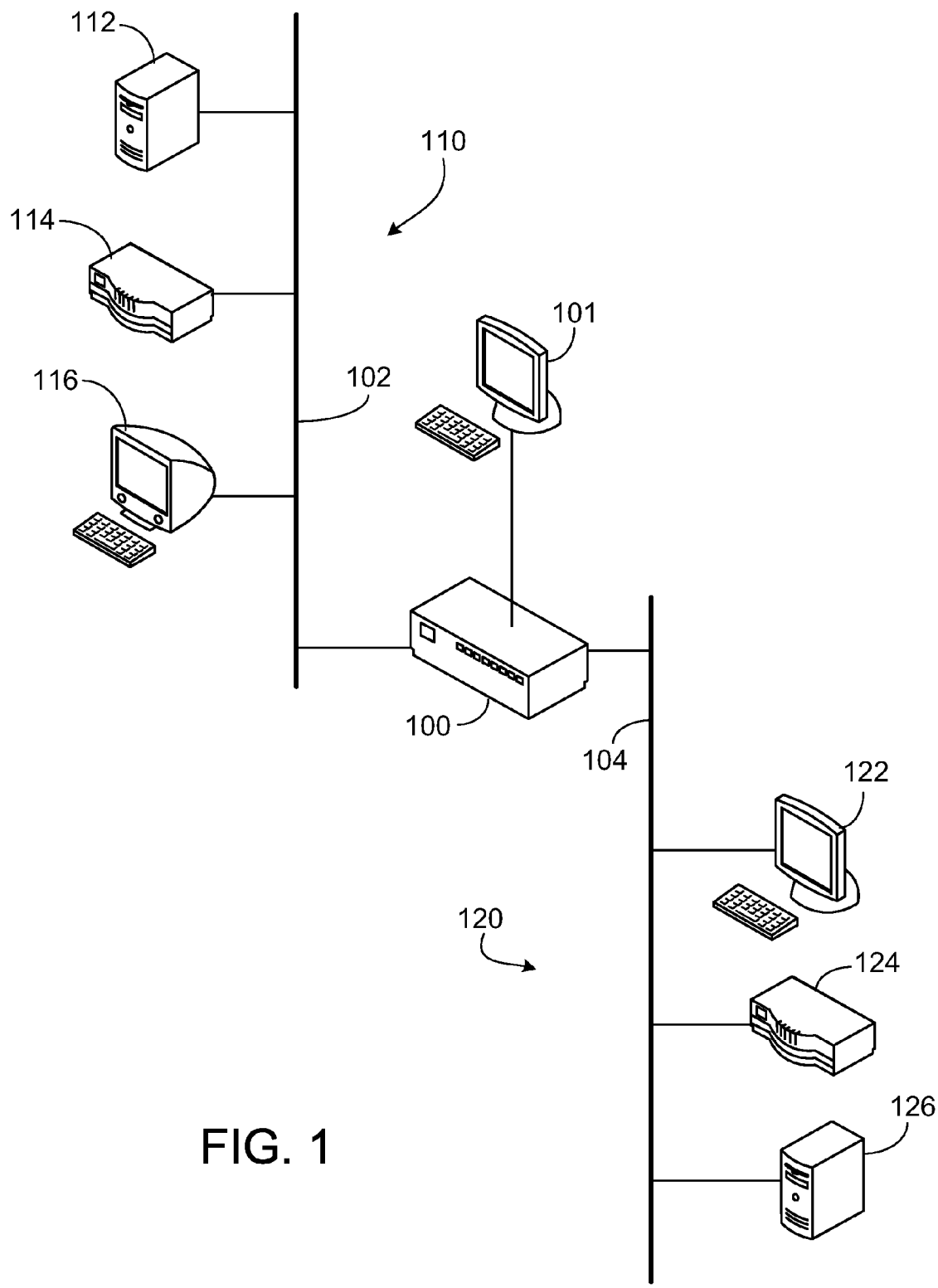
FIGS. 1-2 show two communications networks and a multi-network device.

FIG. 1 shows a multi-network device 100 that carries communications between a network 110 operating over one type of medium 102 and another network 120 operating over another type of medium 104. The multi-network device 100 directly participates in communications on both networks. The multi-network device 100 can transmit and receive communications between itself and any of the network devices 112, 114, 116 on one network 110 as well as transmit and receive communications between itself and any of the network devices 122, 124, 126 on the other network 120. Further, the multi-network device 100 can receive communications from any of the network devices 112, 114, 116 on one network 110 and pass them to any of the network devices 122, 124, 126 on the other network 120. In some implementations, the multi-network device 100 may coordinate with one or more devices on the networks 110, 120 that serve as master devices for network traffic communicated over that network. For example, the multi-network device may coordinate with a master device 114 that coordinates traffic on one network 110, and coordinate with a master device 124 that coordinates traffic on the other network 120. In some implementations, the master devices 114, 124 also coordinate with each other separately from the multi-network device 100.

In some implementations, the network 110 operates over power lines as the medium 102, and the other network 120 operates over coaxial cable as the medium 104. However, the networks 110, 120 may operate over other types of media than these (e.g., telephone lines, wireless or a traditional computer network medium such as Ethernet cable). In some implementations, the networks 110, 120 are separate networks operating over the same type of physical medium.

In some implementations, the multi-network device 100 is connected to a host device 101 that sends and receives network communications to one or more of the networks 110, 120. The host device 101 could include one of many different types of devices, such as a computer, television, digital video recorder, or another kind of device. In some implementations, the multi-network device 100 and the host device 101 are a single integrated device.

Figure 2:
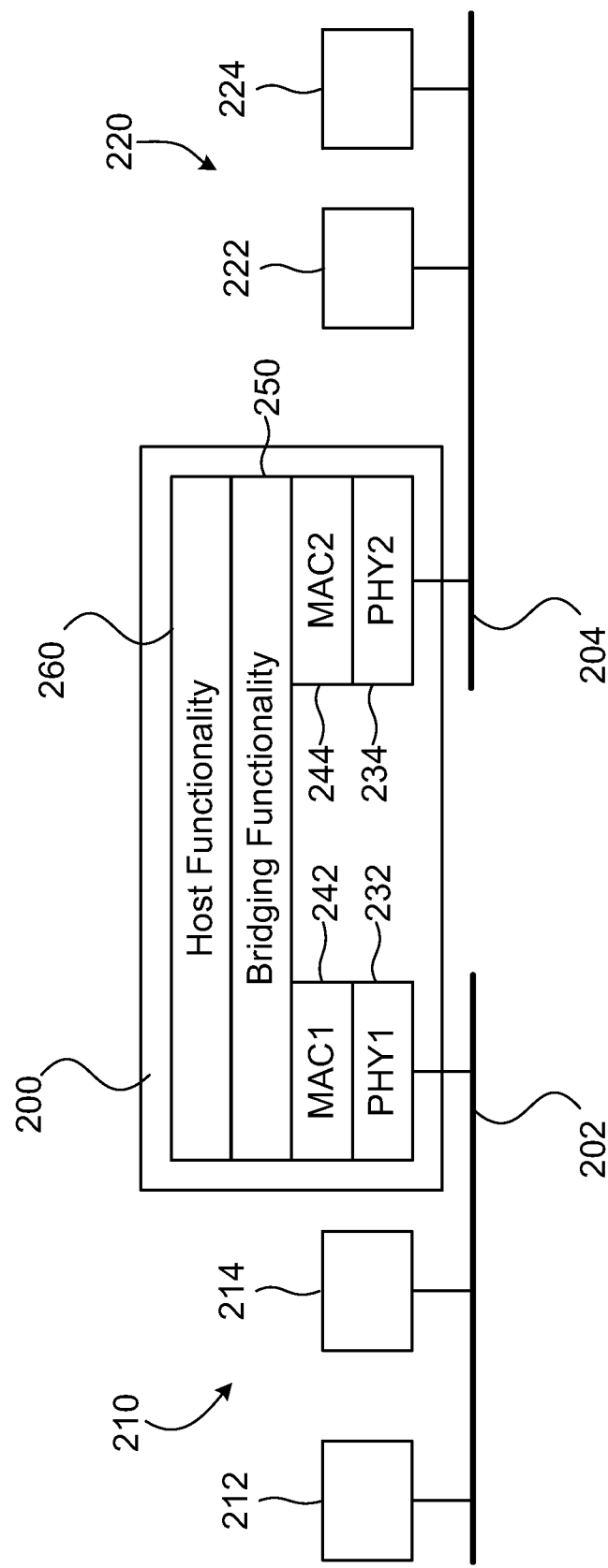

FIG. 2 shows an example of a multi-network device 200 connecting two networks 210, 220 each operating over a different medium 202, 204. In this example, the multi-network device 200 and the network devices 212, 214 on the first network 210 can communicate using the first medium 202, and the multi-network device 200 and the network devices 222, 224 on the second network 220 can communicate using the second medium 204. The multi-network device 200 enables the network devices only connected to one network to communicate with the network devices only connected to the other network.

This multi-network device 200 contains a separate physical layer (PHY) 232, 234 and a separate medium access control layer (MAC) 242, 244 for each medium 202, 204. Thus, there is a PHY and MAC assigned to one of the media, and another PHY and another MAC assigned to the other medium. The multi-network device 200 also includes additional bridging functionality 250 that enables it to process and retransmit traffic received on one of the media on to the other medium. The bridging functionality 250 can operate under a MAC protocol or another type of protocol. For example, the protocol could be a higher-layer protocol, such as Internet Protocol (IP) that operates on the network layer above the MAC layer. In some implementations, the multi-network device 200 also has host functionality 260 for handling other functions of the device. For example, the multi-network device 200 may generate its own network communications destined for a network device on one of the connected networks, or the time-shared multi-network device may be directly connected to a host device that generates and receives network communications.

Figure 3:
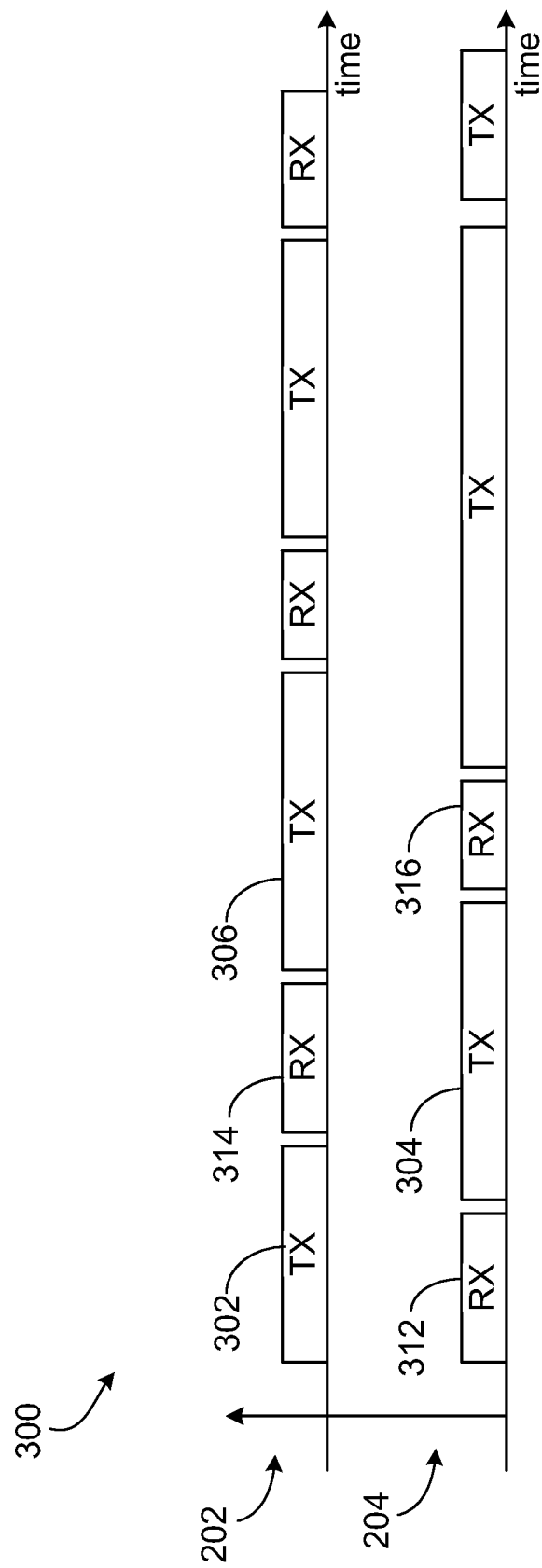
FIG. 3 shows a plot of traffic on two networks.

FIG. 3 shows exemplary plots of the activity of the multi-network device 200 on the first medium 202 (plot 300) and on the second medium 204 (plot 301) as a function of time. Because there is a MAC and a PHY for each network, the multi-network device 200 can simultaneously communicate on all media to which it is connected. The blocks 302, 304, 306 labeled as "TX" indicate time intervals where the multi-network device 200 is transmitting on the respective medium. The blocks 312, 314, 316 labeled as "RX" indicate time intervals where the multi-network device 200 is receiving on the respective medium. Some of the "TX" blocks (e.g., block 302) on the first medium 202 overlap in time with some of the "RX" blocks (e.g., block 312) and "TX" blocks (e.g., block 304) on the second medium 204, and some of the "TX" blocks (e.g., block 306) on the first medium 202 overlap in time with some of the "TX" blocks (e.g., block 304) and "RX" blocks (e.g., block 316) on the second medium 204.

Time-Shared Multi-Network Devices

Multi-network devices that use a separate MAC and PHY for each medium can be expensive due to the presence of duplicate PHYs and MACs. However, another type of multi-network can use time-sharing over a single MAC and single PHY that can be used on any media to which it is attached, even if the media are of different types and belong to different networks.

Figure 4:
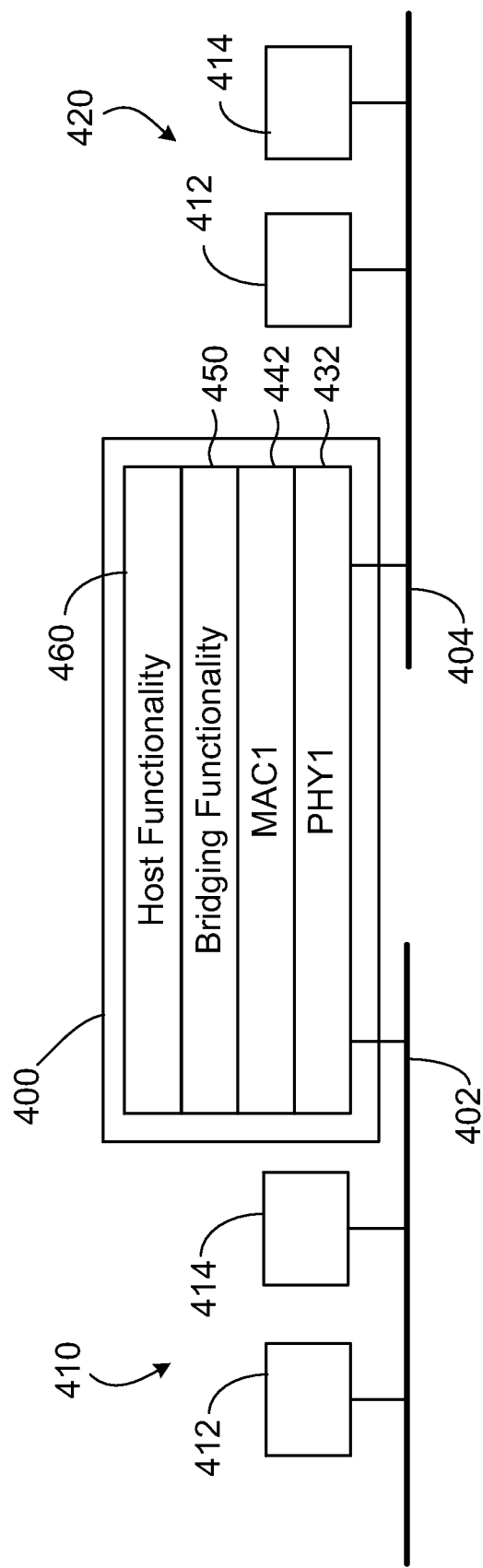
FIG. 4 shows communications networks and a multi-network device.

FIG. 4 shows an example of a time-shared multi-network device 400 connected to two networks 410, 420 operating over two types of media 402, 404. In this example, devices 400, 412, 414 on one network 410 can communicate using one medium 402, while devices 400, 422, 424 on the other network 420 can communicate using the other medium 404. The time-shared multi-network device 400 enables network devices on one network to communicate with network devices on the other network. The time-shared multi-network device 400 has bridging functionality 450 for processing network communications from one network destined for another network. In some implementations, the time-shared multi-network device 400 has host functionality 460 for handling other functions of the device. For example, the time-shared multi-network device 400 may generate or receive its own network communications, or the time-shared multi-network device may be directly connected to a host device that generates and receives network communications.

The time-shared multi-network device 400 has a single PHY 432 and a single MAC 444 that can operate on both media 402, 404. In some implementations, the design of the MAC 444 and PHY 432 can be tailored to the underlying media characteristics. Either or both of the MAC 444 and PHY 432 may have configurable features that can be enabled or disabled to provide compatibility with different media. For example, the PHY 432 can be designed to use Orthogonal Frequency Division Multiplexing (OFDM) based modulation. However, the number of sub-carriers used on each medium 402, 404 could be different to account for the characteristics of each medium that may affect sub-carrier choice. Further, the MAC 442 and PHY 432 may have features that are only applicable to some types of media. For example, if one medium is a power line, the MAC 442 may use an alternating current (AC) line cycle tracking mechanism to determine a beacon period defined by repeated beacon transmissions that are synchronized to the tracked line cycle of the AC waveform on the power line medium. This enables the MAC 442 to adapt to the characteristics of the power line medium as described, for example, in U.S. Publication No. 2007/0025391, incorporated herein by reference. If another medium is a medium such as coaxial cable whose characteristics are not affected by the AC waveform, the MAC 442 may not use the AC line cycle tracking mechanism with that medium.

Further, the PHY 432 may interface with each medium in a different way. If one medium is a power line, the PHY 432 may use power plug prongs to connect to the power line. If the medium is a coaxial cable, the PHY 432 may use a coaxial cable connector (e.g. RG-6) to connect to the coaxial cable. If the medium is a phone line, the PHY 432 may use a phone line connector (e.g. RJ-11) to connect to the phone line.

Figure 5:
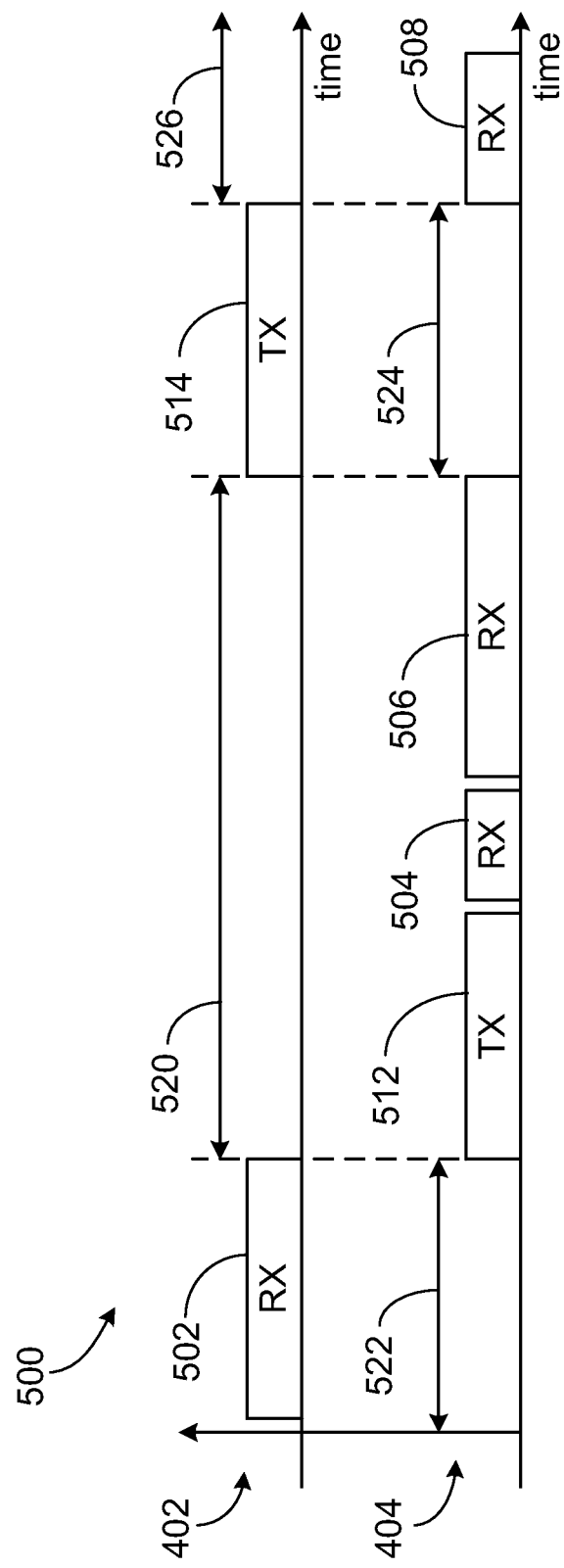
FIGS. 5-6 show plots of traffic on two networks.

The PHY 432 and MAC 442 of the time-shared multi-network device 400 can use time-division multiplexing (TDM) to communicate over multiple media. FIG. 5 shows exemplary plots of the time-shared multi-network device's activity on two media 402, 404 as a function of time in plots 500, 501, respectively. During some time intervals 522, 524, the PHY and MAC of the time-shared multi-network device 400 are used for transmission 514 and reception 502 over one medium 402. During these intervals 522, 524, the time-shared multi-network device 400 is not available for transmission and reception of data from the devices on the other medium 404. Similarly, in certain intervals 520, 526 the time-shared multi-network device 400 is only available for transmission 512 and reception 504, 506, 508 on the other medium 404. In some implementations, the PHY 432 and MAC 442 of the time-shared multi-network device 400 can use a carrier sense multiple access protocol (CSMA) with defined time periods during which a network is evaluated to determine if it is carrying a signal, or if the network is available to receive communications.

In some implementations, the time shared multi-media device may be designed to transmit on one medium while receiving on another medium and vice versa. Some physical layer designs have several components that have a different arrangement of components for circuitry configured to transmit and circuitry configured to receive. For example, in some implementations, the forward error correction (FEC) encoder is a separate block from the FEC decoder. When FEC encoder is being used for transmitting data, the FEC decoder will be turned-off (i.e., non-operational) and vice versa. Some implementations can leverage this type of redundancy enabling time-shared multi-media devices to transmit on one medium while receiving on another medium, thus enhancing the performance without significantly increasing the cost.

The time-shared multi-network device 400 can also perform other functions to coordinate communications among two networks. For example, the time-shared multi-network device 400 can communicate information to devices on one network about which devices are available on the other network.

Medium Access

A time-shared multi-network device can coordinate medium access for all media to which the device is connected. For example, network devices on each medium are aware of the time intervals during which the time-shared multi-network device is available for transmission and reception of data on their respective medium. A variety of techniques can be used to facilitate this coordination.

In some implementations, the access control for each medium is centrally managed by a master device, and the master devices negotiate with one another to determine the time-sharing schedule of the time-shared multi-network device. For example, the master devices may send and receive messages containing potential schedules or containing coordination information. The coordination information may include their respective scheduling constraints such as how much access time each master device will need for each network. The coordination information may also include information used to synchronize scheduling operations between the master devices. In some implementations, if the master devices use a common clock to set timed events such as a beacon period, the master devices may regularly update the common clock among one another. In some implementations, the coordination information could also include information about the timing and duration of the beacon period itself. In some implementations, the coordination information could include information about the scheduling constraints of the medium of each respective master device with regard to how the scheduling constraints affect the time-sharing schedule. For example, for a power line medium, a scheduling constraint of the medium may be determined based on a characteristic of the medium such as noise characteristics that are correlated with an AC power waveform propagating on the medium, as described in more detail in U.S. Publication No. 2007/0025391, incorporated herein by reference. The master devices may also send and receive other kinds of scheduling and coordination information.

In some implementations, one of the network devices on one medium may become the global master device for coordinating the time-sharing schedule of the time-shared multi-network device. The master device on each medium may request from the global master device information about the availability of time-shared multi-network device. The global master device and other master devices may send and receive messages containing potential schedules or containing coordination information.

In some implementations, the time-shared multi-network device may become the global master device of some or all the networks that it interconnects, and may manage the time-sharing schedule based on the traffic needs of the media. For example, the time-shared multi-network device could have dedicated schedule coordination circuitry so that it can perform the functions of a master device.

In some implementations, the time-shared multi-network device itself may determine the time-sharing schedule for the media and notify all network devices on each medium. In some implementations, this approach can be used when medium access is not centrally managed. In some implementations, the time-shared multi-network device determines the time-sharing schedule for one medium and coordinates with another master device that determines the time-sharing schedule for another medium.

Other techniques for coordinating the time-sharing of a time-shared multi-network device are possible.

Network Characteristics

The time-sharing schedule for each medium can take into account the traffic characteristics and the Quality of Service (QoS) requirements for the traffic flowing through the multi-network from one medium to another. In some implementations, the time-shared multi-network device may itself be connected to a host device that generates time-sensitive application traffic (e.g., a real-time video stream). In this case, the time-sharing schedule can take into account the traffic characteristics and QoS requirements of the time-sensitive application traffic.

Figure 6:
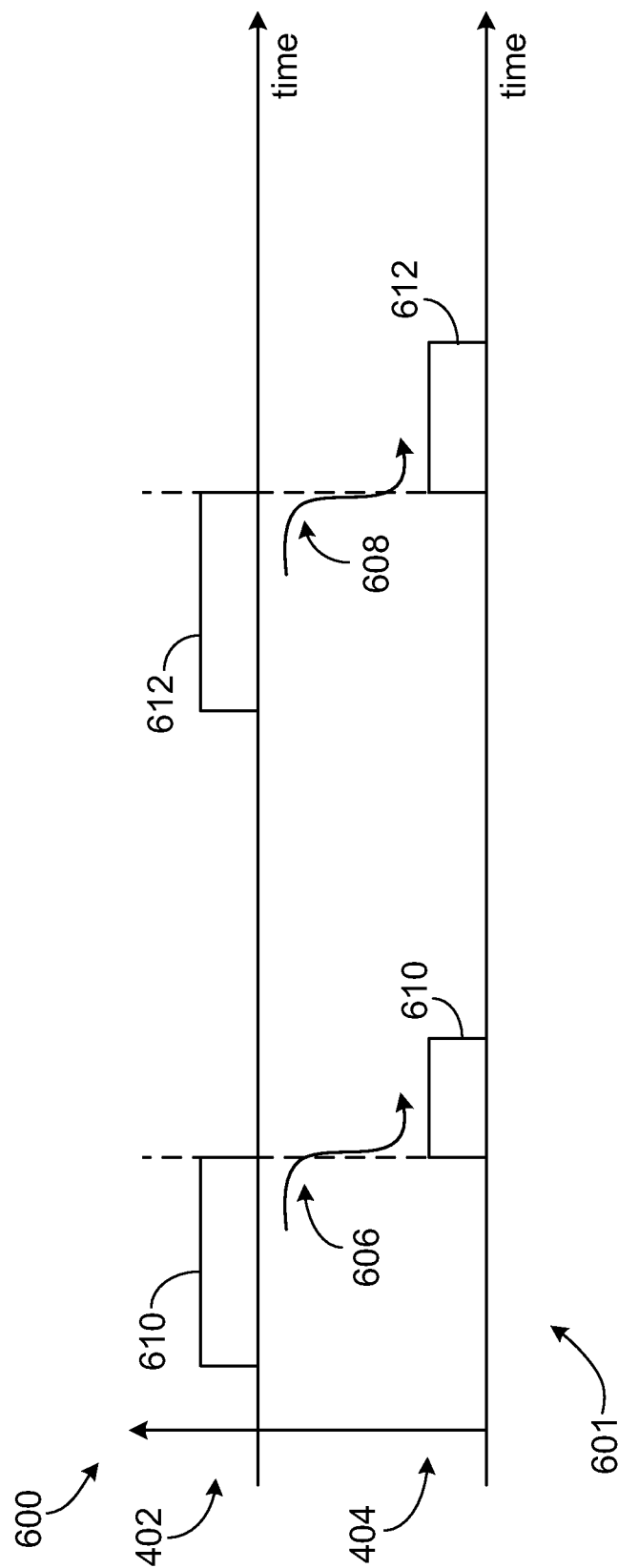

For example, the time-shared multi-network device may be configured to provide low latency communication between network devices. FIG. 6 shows exemplary plots of communications between networks operating on two media 402, 404 as a function of time (plots 600 and 601, respectively) using the time-shared multi-network device in a manner that provides low latency. In this example, one network device provides latency-sensitive traffic to another network device. The time sharing among media is done in a manner such that the time-shared multi-network device can immediately retransmit 606, 608 the packets 610, 612 received from one network device on one medium 402 to the other network device on the other medium 404. In addition to reducing latencies, this approach can also reduce buffer size requirements at the time-shared multi-network device, for example, when a buffer is used to store packets before retransmitting them on a different medium. When data is immediately retransmitted from one medium to another medium, the rate at which data is transferred can be adjusted to correspond to a data rate that can be used with the slower of the two media. For example, if one medium 404 has a slower maximum data rate than another medium 402, the slower maximum data rate can be used as the maximum data rate for communications between the two media.

Time Sharing

A variety of media can be interconnected via a time-shared multi-network device. An example of one type of medium is a power line medium. In some power line communication technologies, a beacon period or TDM access (TDMA) cycle is synchronized to the underlying AC line cycle. Thus, the beacon period can vary with the variation of the underlying AC line cycle. For example, the AC line cycle could have a frequency of approximately 60 Hz. However, the momentary AC line cycle frequency can vary from 60 Hz. For example, the frequency may be 60.1 Hz during some times and it may be 59.9 Hz during other times. This variation in AC line cycle frequency will cause the beacon period to also vary because the beacon period at any moment is dependent on the AC line cycle frequency at that moment. The allocations for various nodes are relative to the Beacon Period start time, and hence can also vary with the AC line cycle frequency.

Figure 7:
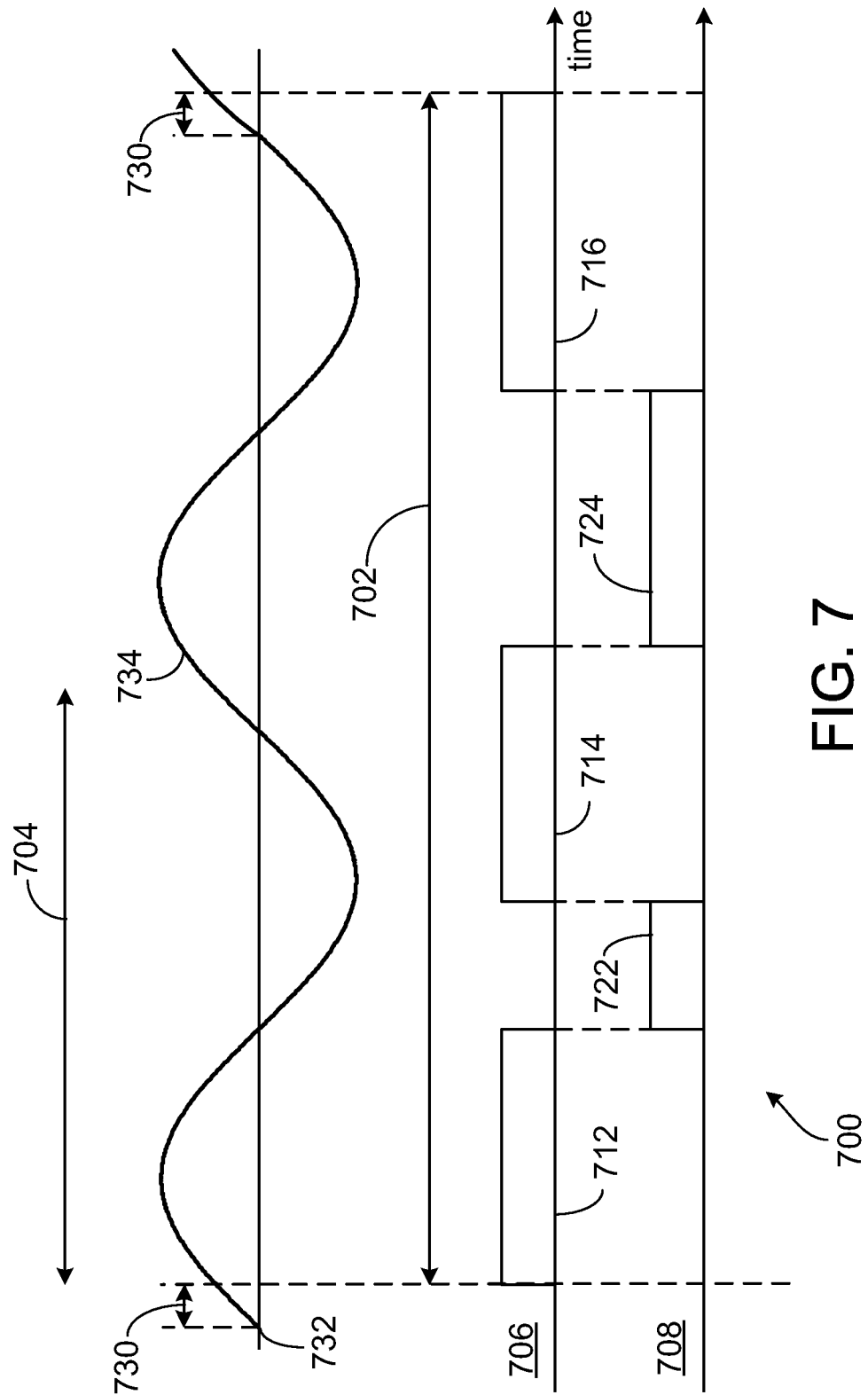
FIG. 7 shows a plot of traffic on two networks and an alternating current waveform.

The time-sharing schedule of a time-shared multi-network device that connects a power line medium to other media (e.g., coaxial cable, phone lines, Ethernet, or other media) can take into account the variation of the beacon period with respect to the AC line cycle period. FIG. 7 shows an example of a time-sharing schedule 700 of a time-shared multi-network device that is connected to a power line medium 706 and a coaxial medium 708. In this example, the beacon period 702 on the power line medium is twice the AC line cycle period 704. The time-shared multi-network device's availability 712, 714, 716 on the power line as well as the availability 722, 724 on the coaxial medium depends on the beacon period 702 and the corresponding AC line cycle frequency. For example, the time-shared multi-network device could have a period of availability 712 on the power line that commences with the beacon period 702. In the example shown in FIG. 7, the beacon period 702 commences at a fixed offset 730 from the zero cross 732 of the AC waveform 734. The schedule for the coaxial medium 708 is coordinated with the schedule of the power line medium 706 to take into account the variation of the schedule due to the variation of the start time and duration of the beacon period 702 and the AC line cycle frequency. In some implementations, the information about the beacon period and the AC line cycle frequency is received from a master device on the network operating on the power line medium, or from another master device. In some implementations, the information about the beacon period and the AC line cycle frequency is determined by the time-shared multi-network device.

Schedule Coordination

The time-shared multi-network device's period of availability on the coaxial medium can be based on the AC line cycle variations that can occur on the power line medium. A variety of techniques can be used to synchronize the period of availability on the coaxial medium to the beacon period of the power line medium.

In some implementations, the master device of the network operating over the coaxial medium may track the AC line cycle period, thus enabling the master device to vary the schedule on coax medium as a function of the AC line cycle period. Note that coax devices are typically connected to the AC mains to obtain power supply. Additional circuitry can be added to the power supply track the AC line cycle frequency. AC line cycle frequency can be obtained, for example, by tracking the AC line cycle zero cross or any specific voltage level of the AC line cycle.

In some implementations, the time-shared multi-network device may provide information on the AC line cycle variations to the master device for the coaxial medium network. For example, this information might include the beacon period start time and beacon period duration. The time-shared multi-network device could provide this information for each beacon period, for example, or it could provide this information whenever changes in the beacon period is noticed, for example.

In some implementations, the time-shared multi-network device may provide just the TDMA schedule of the power line network, absent explicit information on the beacon period variations. The TDMA schedule information may include TDMA schedules for the next beacon period, for example, or the information may include TDMA schedules for a few beacon periods in the future, for example. Due to the dependency of the beacon period on the AC line cycle, the TDMA schedules for power line cannot necessarily be predicted for large number of future beacon periods. In some implementations, the TDMA schedules can be tracked up to a maximum of four future beacon periods.

In some implementations, the time-shared multi-network device may become the master device of the coaxial medium network and the power line medium network. This enables the time-shared multi-network device to schedule its access to both media, taking into account the variations in the AC line cycle frequency.

Multiple Time-Shared Bridges

Multiple time-shared multi-network devices can be used to interconnect media. When multiple time-shared multi-network devices are used, the time-sharing schedules of all the time-shared multi-network devices can be coordinated. Each of the time-shared multi-network devices can use one or more of the multiple possible techniques for determining a time-sharing schedule. Additionally, the time-shared multi-network devices may communicate with each other and with the master of each medium to determine a time-sharing schedule for each medium and each multi-network.

Figure 8:
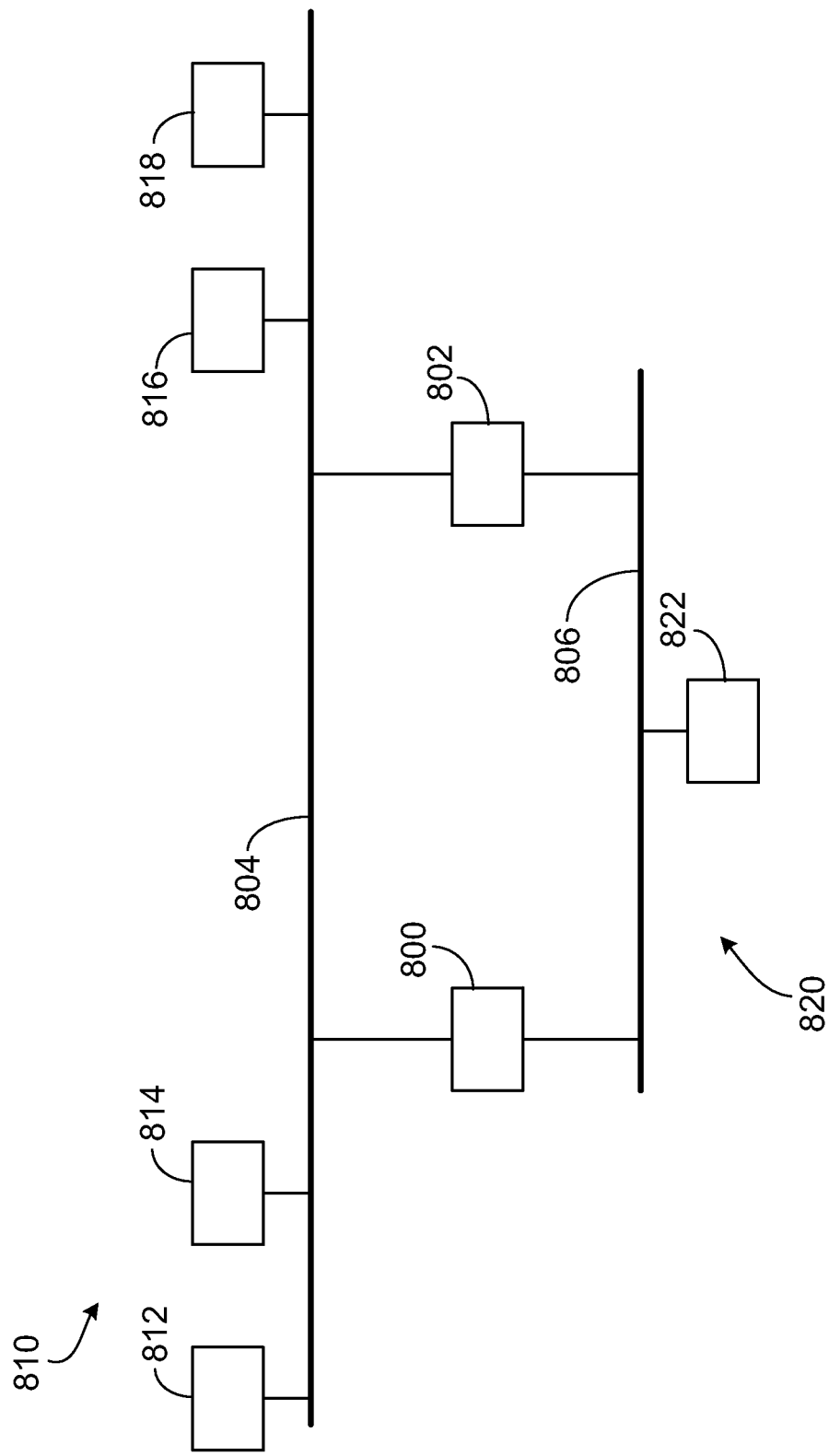
FIG. 8 shows communications networks and multi-network devices.

FIG. 8 shows an example in which two time-shared multi-network devices 800, 802 connect a network 810 operating on a power line medium 804 to a network 820 operating on a coaxial medium 806. When multiple time-shared multi-network devices 800, 802 are available, the network devices 812, 814, 816, 818, 822 on each medium can choose the time-shared multi-network device or devices through which they communicate to network devices on the other medium. For example, a network device 814 on the power line medium 804 can choose either time-shared multi-network device 800, 802 to communicate with a network device 822 on the coaxial medium 806. Although this example uses a power line medium and a coaxial medium, multiple time-shared multi-network devices could be used with other kinds of media, and each device could also interconnect three or more networks or types of media.

The selection of the time-shared multi-network device can take into account several factors. In some implementations, the time-shared multi-network device can be chosen based on the data rate that can be achieved through each of the time-shared multi-network devices. For example, one network device may achieve a higher data rate when communicating through one time-shared multi-network device, while another network device may achieve a higher data rate when communicating through another time-shared multi-network device.

In some implementations, the time-shared multi-network device can be chosen based on the capabilities of each time-shared multi-network device. For example, some time-shared multi-network devices may be able to provide sophisticated control of QoS (e.g., latency, or other factors that may affect some types of network traffic) while other time-shared multi-network devices may only provide limited support for QoS.

In some implementations, the time-shared multi-network device can be chosen based on the availability of the time-shared multi-network devices. For example, some time-shared multi-network devices may be more available than other time-shared multi-network devices based on the traffic that is flowing across each one. Some time-shared multi-network devices could be idle or under capacity, while others could be near or at full capacity.

In some implementations, network devices operating on the same medium may communicate with each other through other media accessible through time-shared multi-network devices, despite the availability of their common medium. For example, one network device 814 operating on the power line medium 804 may communicate to another network device 816 operating on the same power line medium 804 by communicating over the coaxial medium 806 using two time-shared multi-network devices 800, 802. For example, routing the traffic through the coaxial medium 806 may provide better throughput and QoS than directly communicating over the power line medium 804 due to low data rates and high error rates on the power line medium.

The techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, readable by a general or special purpose programmable computer or delivered over a medium (e.g., encoded in a propagated signal) such as network to a computer where it is executed. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software.

Many other implementations of the invention other than those described above are within the invention, which is defined by the following claims.

What is claimed is:

1. An apparatus comprising:
   a first signal interface configured to communicate via a first communication medium coupled to a first node of a first network, wherein
      the first node is configured to communicate according to a scheduling constraint of the first communication medium,
      the scheduling constraint is based, at least in part, on a varying time period of a waveform associated with the first communication medium and on a variation of a beacon period associated with the first communication medium;
   a second signal interface configured to communicate via a second communication medium coupled to a second node of a second network, wherein
      the second node is configured to communicate according to a schedule compatible with the scheduling constraint of the first communication medium,
      the first communication medium is a first medium type, the first medium type being a powerline medium capable of carrying alternating current, and the second communication medium is a second medium type that is different from the first medium type; and
   a signal coupling unit configured to utilize at least one of the first signal interface and the second signal interface to communicate information between the first node and the second node, according to the schedule.

2. The apparatus of claim 1, wherein the first node is integrated with the signal coupling unit.

3. The apparatus of claim 1, wherein the signal coupling unit is configured to communicate with a coordination device capable of generating the schedule.

4. The apparatus of claim 1, further comprising a schedule coordination unit configured to generate the schedule.

5. The apparatus of claim 1, wherein the first signal interface and the second signal interface share a common medium access control layer interface.

6. The apparatus of claim 1, wherein the first signal interface and the second signal interface share a common physical layer interface.

7. The apparatus of claim 1, wherein the scheduling constraint is further based on the waveform of the alternating current.

8. The apparatus of claim 1, wherein signals communicated via the first communication medium are communicated according to a time division multiple access protocol.

9. The apparatus of claim 1, wherein signals communicated via the first communication medium are communicated according to a carrier sense multiple access protocol with defined time periods of carrier sensing.

10. A method comprising:
    communicating via a first communication medium coupled to a first node of a first network, wherein the first node is configured to communicate according to a scheduling constraint of the first communication medium, and
    the scheduling constraint is based, at least in part, on a varying time period of a waveform associated with the first communication medium and on a variation of a beacon period associated with the first communication medium; communicating via a second communication medium coupled to a second node of a second network, wherein the second node is configured to communicate according to a schedule compatible with the scheduling constraint of the first communication medium, the first communication medium is a first medium type, the first medium type being a powerline medium capable of carrying alternating current, and the second communication medium is a second medium type that is different from the first medium type; and
    communicating information between the first node and the second node, according to the schedule, wherein
    said communicating the information comprises communicating via the first communication medium and via the second communication medium.

11. The method of claim 10, further comprising communicating the information using a host device.

12. The method of claim 10, further comprising communicating information via network signals from the first node to a plurality of other nodes.

13. The method of claim 10, further comprising receiving the schedule.

14. The method of claim 10, further comprising generating the schedule.

15. The method of claim 14, further comprising communicating the schedule to at least one of the first node and the second node.

16. The method of claim 10, further comprising configuring features of a network interface based on the first and the second communication mediums.

17. The method of claim 10, further comprising determining the scheduling constraint according to the waveform of the alternating current carried by the first communication medium.

18. The method of claim 10, further comprising determining the scheduling constraint based, at least in part, on traffic characteristics of the first network.

19. The method of claim 10, further comprising determining the scheduling constraint based, at least in part, on an application of quality of service requirements of the first network.

20. The apparatus of claim 1, wherein the scheduling constraint is further based on a variation of a cycle period of the waveform of the alternating current.

21. The apparatus of claim 1, wherein the scheduling constraint is further based on noise characteristics correlated with the alternating current.

22. A non-transitory machine-readable storage media having machine executable instructions stored therein, the machine executable instructions comprising instructions to: communicate via a first communication medium coupled to a first node of a first network, wherein the first node is configured to communicate according to a scheduling constraint of the first communication medium, and the scheduling constraint is based, at least in part, on a varying time period of a waveform associated with the first communication medium and on a variation of a beacon period associated with the first communication medium;

communicate via a second communication medium coupled to a second node of a second network, wherein the second node is configured to communicate according to a schedule compatible with the scheduling constraint of the first communication medium, the first communication medium is a first medium type, the first medium type being a powerline medium capable of carrying alternating current, and the second communication medium is a second medium type that is different from the first medium type; and communicate information between the first node and the second node according to the schedule, wherein the information is communicated via the first communication medium and via the second communication medium.

\* \* \* \* \*